United States Patent [19]

Zimmermann et al.

[11] Patent Number: 4,781,956
[45] Date of Patent: Nov. 1, 1988

[54] INTERIOR TRIM COMPONENT FOR A MOTOR VEHICLE

[75] Inventors: Willibald Zimmermann, Cologne; Klaus Hartmann; Heinz Wessel, both of Bergisch-Gladbach, all of Fed. Rep. of Germany

[73] Assignee: Ford Motor Company, Dearborn, Mich.

[21] Appl. No.: 813,304

[22] Filed: Dec. 24, 1985

[30] Foreign Application Priority Data

Jan. 17, 1985 [DE] Fed. Rep. of Germany ....... 3501354

[51] Int. Cl.$^4$ .............................................. B32B 7/06
[52] U.S. Cl. ..................................... 428/43; 428/165; 428/172; 428/174
[58] Field of Search .................... 428/31, 43, 165, 172, 428/174

[56] References Cited

U.S. PATENT DOCUMENTS

| | | | |
|---|---|---|---|
| 2,099,989 | 11/1937 | Osborn | 428/172 X |
| 2,131,728 | 10/1938 | Denman | 428/165 X |
| 2,303,195 | 11/1942 | Buff | 428/165 X |
| 2,322,226 | 6/1943 | Cunnington | 428/172 X |
| 2,550,455 | 4/1951 | Davies | 428/165 X |
| 2,616,823 | 11/1952 | Weymouth | 428/165 X |
| 2,699,416 | 1/1955 | Lyijynen et al. | 428/165 X |
| 3,046,179 | 7/1962 | Stallard | 156/274.4 X |
| 3,047,451 | 7/1962 | Beck et al. | 156/219 |
| 3,052,587 | 9/1962 | Spieles | 156/220 |
| 3,257,252 | 6/1966 | Keel | 156/79 |
| 3,361,610 | 1/1968 | Hannes | 428/174 X |
| 3,374,045 | 3/1968 | Mance et al. | 156/219 X |
| 3,429,728 | 2/1969 | Goldstone et al. | 428/174 |
| 4,245,630 | 1/1981 | Lloyd et al. | 428/172 X |

FOREIGN PATENT DOCUMENTS

| | | |
|---|---|---|
| 0053747 | 6/1982 | European Pat. Off. |
| 0118796 | 9/1984 | European Pat. Off. |
| 2937399 | 4/1981 | Fed. Rep. of Germany |
| 3233675 | 3/1984 | Fed. Rep. of Germany |

OTHER PUBLICATIONS

Page 318, the title page and verso of the title page, Webster's Seventh New Collegiate Dictionary, G. C. Merriam Company, publishers, Springfield, Mass., U.S.A.

Primary Examiner—Henry F. Epstein
Attorney, Agent, or Firm—Peter D. McDermott; Roger L. May

[57] ABSTRACT

An interior trim component 1 for a motor vehicle comprises a base 2 of a fibrous base material of approximately 80% wood fibers and approximately 20% synthetic resin fibers, which is compressed and consolidated by the action of pressure and heat into the desired shape. Padding and/or a fabric insert 5 may be placed over selected areas of the surface of the base 2 and a sheet 7 of plastic material is bonded over the whole of the visible side of the base 2, the parts of the plastic sheet 7 overlying the insert 5 having a continuous impressed separation so that they may be removed. The fibrous base material which is in the form of fibrous fleece mats of approximately 20 to 30 mm thickness is consolidated in a hot-pressing shaping tool at 4000 N/M$^2$ and approximately 200° C. to a final thickness approximately one tenth the initial thickness, but is consolidated to a lesser extent in selected surface areas 4 to produce a greater final thickness between one fifth and two fifths the initial thickness, so as to provide a cushioning effect.

5 Claims, 5 Drawing Sheets

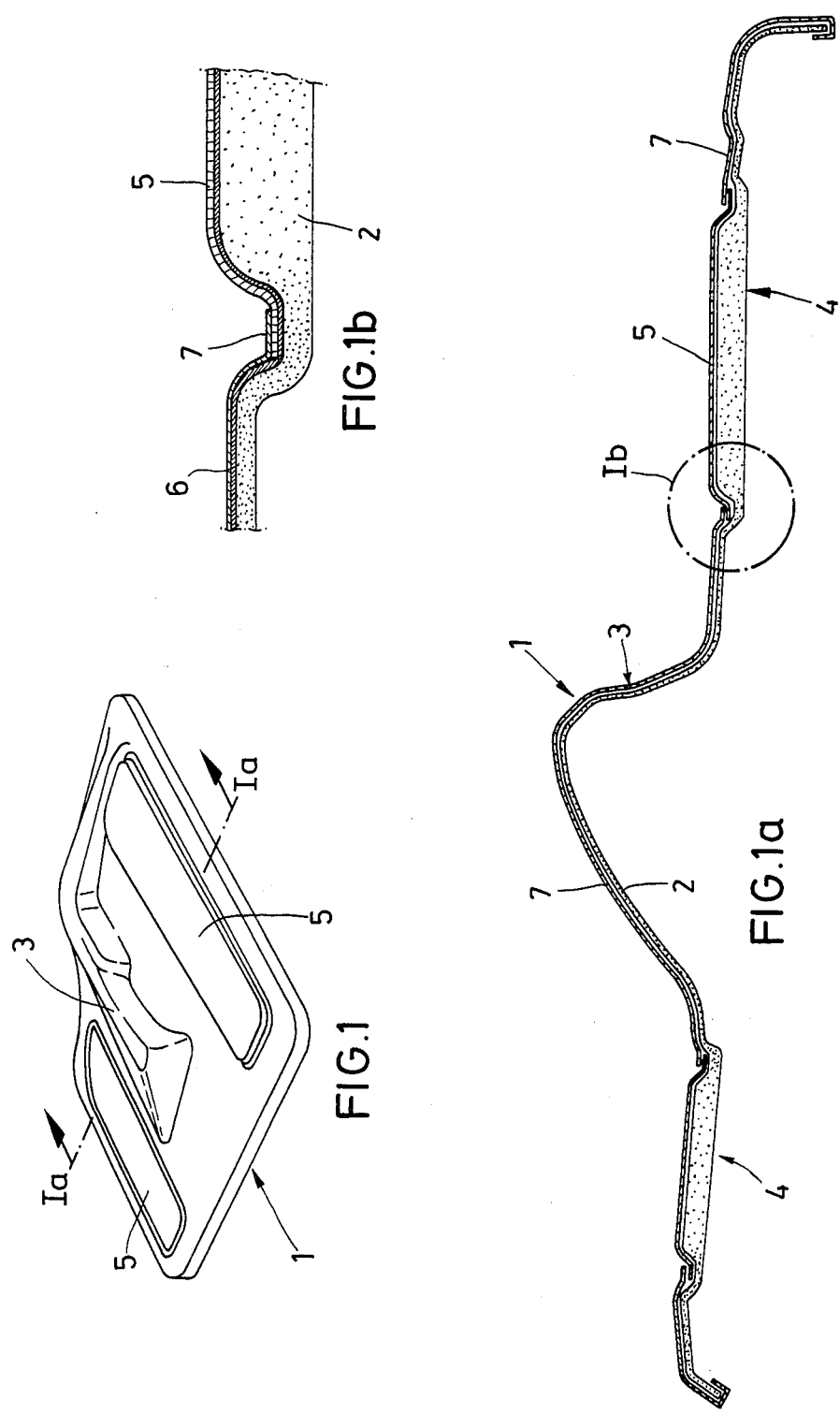

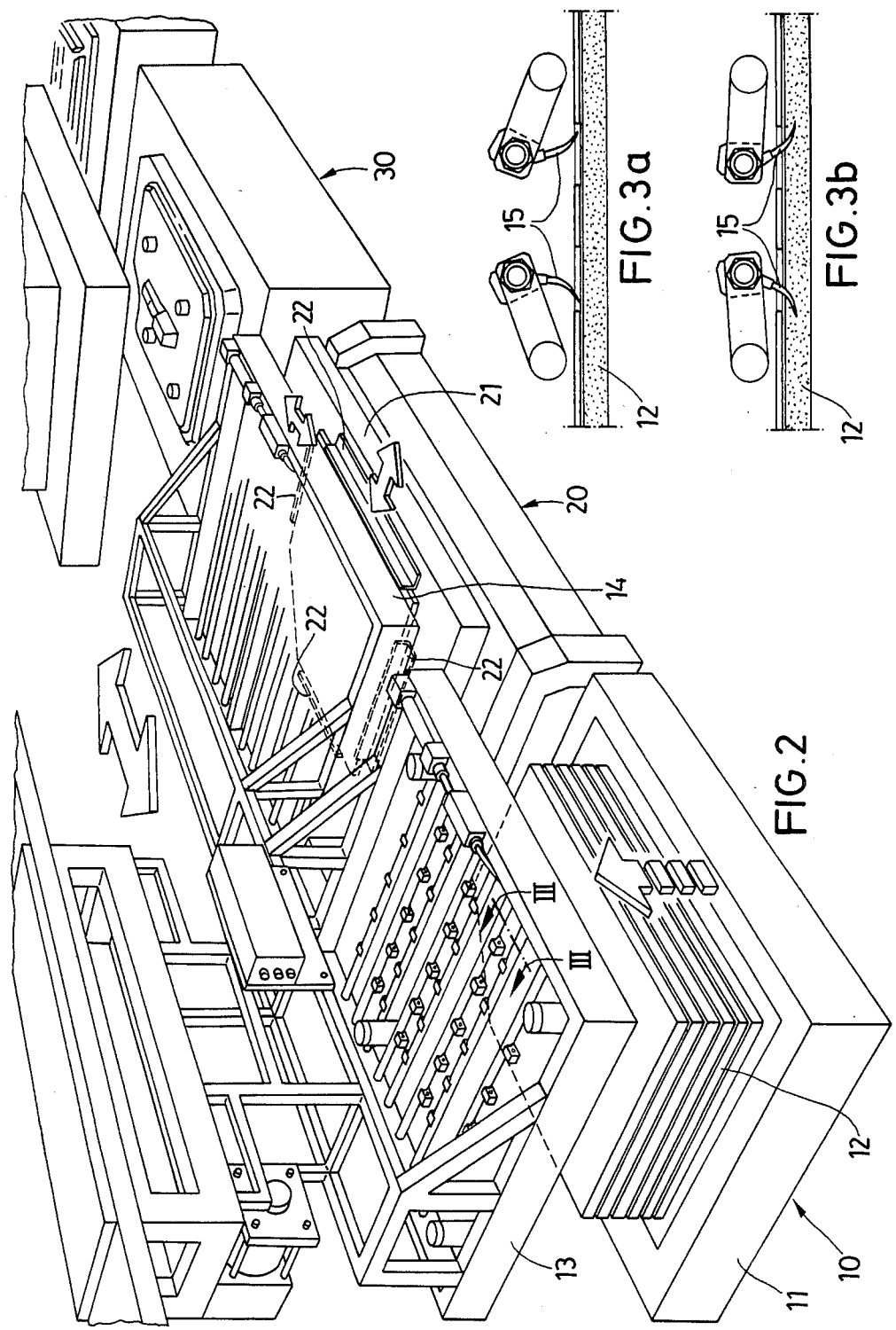

INTERIOR TRIM COMPONENT FOR A MOTOR VEHICLE

The invention relates to an interior trim component for motor vehicles of the type comprising a base of a fibrous base material which is pressed and consolidated by the action of pressure and heat into a desired shape.

An interior trim component for motor vehicles is known from DE-OS No. 29 37 399, the base of which is pressed and consolidated into the desired shape under the action of pressure and heat from a fibrous base material impregnated with binder. Here, a mixture of polyester add acrylic fibers, which are pressed together with a synthetic resin binder in the form of fibrous fleece mats, is selected as the fibrous base material. This known interior trim component has the disadvantage that on account of the high proportion of synthetic material fibers in the base material, it results in a very hard, rigid base which does not have the sound-proofing properties desired for an interior trim component of a motor vehicle.

A further interior trim component for motor vehicles is known from EP A No. 0 118 796, in which is disclosed a solution for a neat arrangement of the desired visible side of the interior trim having different coating materials in different surface areas. The differentiation which is indicated between different coating materials is provided for trim materials not capable of being welded, such as fabric or leather, but requires the difficult formation of deep channels in the base.

An interior trim component for motor vehicles is known from DE OS No. 32 33 675, in which a base, in a Wet process, consists of an inherently stable pressed wood fiber material which is bonded with a plastic sheet in pre-selected surface areas after padding and fabric inserts have been placed in position. In this case, the inherently stable wood fiber material should be directly provided with a structure for the thin plastic sheet by a hot-pressing shaping tool.

A further interior trim component for motor vehicles is known from EP A No. 0 053 747, in which a base is formed by a laminate of two fibrous fleece mats with an interposed piece of corrugated cardboard. A shaping apparatus for the interior trim component is described. This known interior trim component has the disadvantage that it cannot be shaped into any desired shape of varying depth on account of the piece of corrugated cardboard.

The present invention seeks to provide an improved interior trim component for motor vehicles of the type described above in such a way that it permits desired cushioning effects in pre-selected surface areas without the additional arrangement of strips of foam material.

In a separate aspect, the invention seeks to provide an apparatus for the convenient mass production of such an interior trim component.

According to a first aspect of the present invention, there is provided an interior trim component for a motor vehicle, comprising a compressed fiber base and a plastic sheet adhered to the surface of the base, wherein the base is formed by subjecting a fibrous mat to different degrees of compression in different areas, the mat thereby being only partially compressed in selected areas so that the base may exhibit a cushioning effect within the selected areas.

According to a second aspect of the invention, there is provided an interior trim component for a motor vehicle, comprising a base of a fibrous base material which is pressed and consolidated by the action of pressure and heat into the desired shape. A plastic sheet is bonded to the base to cover at least the surface of the component that is visible during use. The fibrous base material. prior to compression, is in the form of fibrous fleece mats of between 20 and 30 mm in thickness and is consolidated in a hot-pressing shaping tool at a pressure of 4000 $N/M^2$ and a temperature of 200° C. to a final thickness of approximately one tenth the initial thickness, the material being consolidated to a lesser extent in pre-selected surface areas to produce a greater final thickness of between two and four tenths the initial thickness, so as to provide a cushioning effect in such selected surface areas.

Preferably, the surface areas having a cushioning effect are covered with padding and/or fabric inserts and the plastic sheet material overlies only the surrounding areas of the base, the plastic sheet being provided with impressed separation seams to enable the removal of the parts of the sheet overlying the inserts. Conveniently, the padding and/or fabric inserts are secured to the base by hot sealing following the application to the entire surface of the base of a thermosetting adhesive for adhering the plastic sheet to the base. In this way. undesired shifting of the inserts is reliably avoided in the subsequent overall plastic material sheet.

In accordance with a further aspect of the invention, there is provided an apparatus for producing an interior trim component as set forth above, comprising a loading station, an aligning station, a shaping station and a sealing station arranged in succession. The apparatus is characterized in that the shaping station comprises a male mold disposed beneath a female mold, the two molds defining a gap of uneven thickness therebetween so that a fibrous mat arranged between the two molds is subjected to different degrees of compression in different areas of its surface.

BRIEF DESCRIPTION OF THE DRAWINGS

The invention will now be described further, by way of example, with reference to the accompanying drawings, in which:

FIG. 1 is a perspective view of an interior trim component according to the invention;

FIG. 1a is a section along the line Ia—Ia in FIG. 1;

FIG. 1b is a section drawn to an enlarged scale of the detail contained in the circle Ib in FIG. 1a;

FIG. 2 is a perspective view of an apparatus for the substantially automatic production of the interior trim component of FIG. 1;

FIG. 3a shows pin grippers of the apparatus in FIG. 2 in their rest position;

FIG. 3b shows the pin grippers of FIG. 3a in their operating position;

Figure 4:
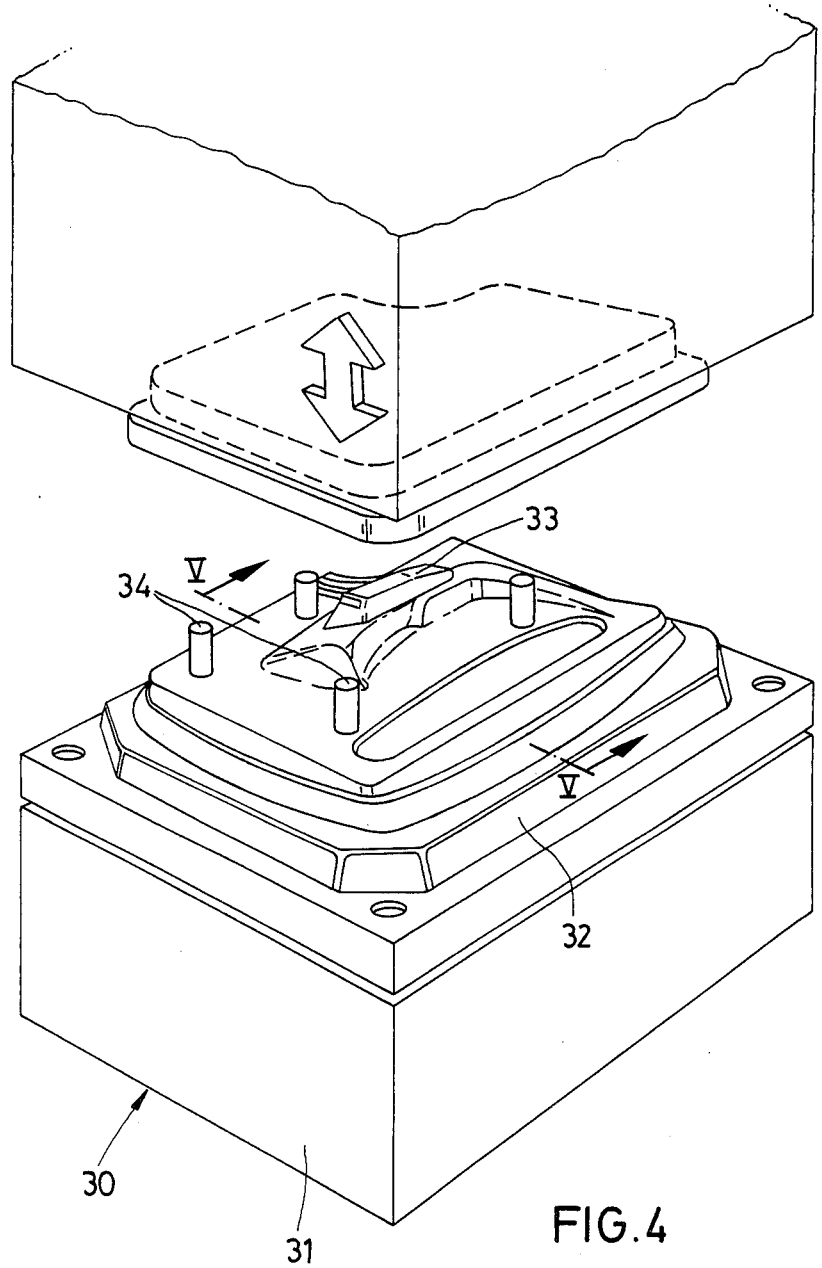
FIG. 4 is a perspective view of the hot shaping tool with the advancing member and ejectors moved out.

The interior trim component 1 illustrated in FIG. 1 is intended for the door of a motor vehicle. The interior trim component 1 comprises a base 2 which is pressed and consolidated by the action of pressure and heat into the desired shape from a fibrous material of approximately 80% wood fibers and approximately 20% synthetic resin fibers. The maximum deformation of the base 2 is required in the region of the arm rest 3. Above the arm rest 3, in a preselected surface area 4 in which a padding and/or fabric insert 5 is to be provided, the base 2 is less compressed so that in this area a cushioning effect is achieved by the less compressed material from which the base 2 is formed.

The base 2 produced in this way is coated all over with a thermosetting adhesive 6 which is necessary for the intended overall bonding to a plastic sheet 7. Padding and/or material inserts 5 of desired shape can be positioned on the surface areas 4 provided and by the action of the adhesive 6 can be secured by hot sealing using a sealing punch corresponding to the peripheral shape of the inserts. The base 2 is then covered with the plastic sheet 7 which is bonded to the entire remaining surface of the base 2 in a manner known per se. Appropriate ornamental strips and the like may be provided.

The manual handling of the fibrous fleece mats is difficult on account of their soft nature, and in the past has led to widely differing positionings in the tool, as a result of which increased wastage and rejects arose. In the preferred embodiment described now with reference to FIGS. 2 to 7, a loading station 10 and an aligning station 20 are arranged upstream of a shaping station 30. A sealing station 40 is arranged downstream of the shaping station.

The loading station 10 comprises a support surface for stacks of fibrous fleece mats 12 supplied o conveying pallets 11. A first loading frame 13 is disposed above the stack of fibrous fleece mats 12 and a seoond loading frame 14, parallel to the flrst loading frame 13, is disposed above the aligning station 20. The two loading frames 13 and 14 can be raised and lowered independently of one another and are continuously movable laterally in a parallel manner.

Each loading frame 13 and 14 is provided with a plurality of pin grippers 15 (FIGS. 3a and 3b) which can be swung in opposite directions toward one another and which allow a fibrous fleece mat 12 to be raised individually from the stack of the loading station 10 or a fibrous fleece mat 12 to be deposited in the aligning station 20 or in the shaping station 30, respectively.

The aligning station 20 comprises a supporting plate 21 on which are provided a plurality of displaceable alignment rails 22 which cooperate with the edges of the flbrous fleece mat 12 to align the mat with the mold. The frame 13 acts to transfer the mats from the stack to the alignment station and the frame 14 moves the mats after they have been aligned from the alignment station to the shaping station.

The shaping station 30, better shown in FIG. 4, consists of a press bed 31 on which a male mold 32 having the shape of the rear of the base 2 is disposed in conventional manner. The male mold 32 includes a pressure actuated advancing member 33 in the region of the base 2 in which the greatest degree of deformation is to take place. When the fibrous fleece mat 12 is introduced into the mold by the second frame 14, the flexible fibrous fleece mat 12 is laid in the position shown in FIG. 5a with an exaggerated bulge in the region of maximum deformation.

Figure 5A:
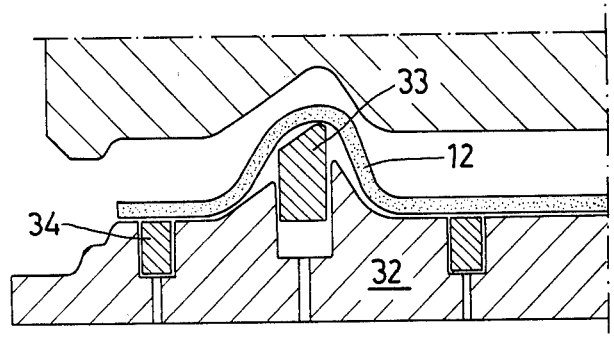
FIG. 5a is a vertical section, along line V—V in FIG. 4, through the shaping tool with the fibrous fleece mat, which bulges forward, inserted.
Figure 5B:
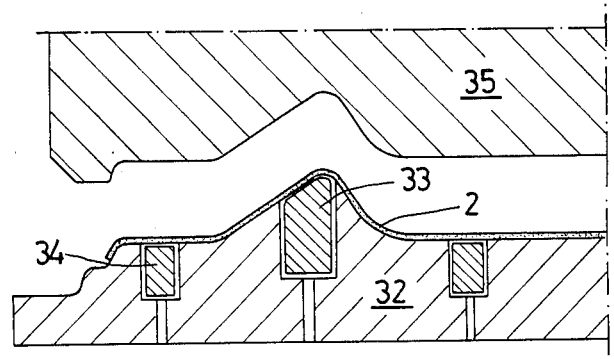
FIG. 5b is a section similar to 5a after the shaping procedure has been carried out.
Figure 5C:
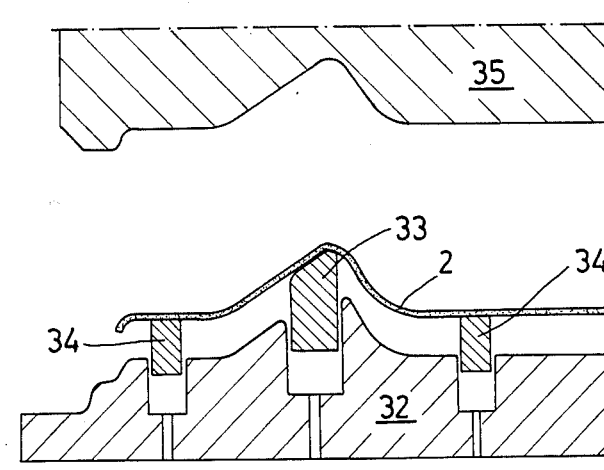
FIG. 5c a view similar to FIG. 5a with the ejectors actuated.
Figures 6, 7:
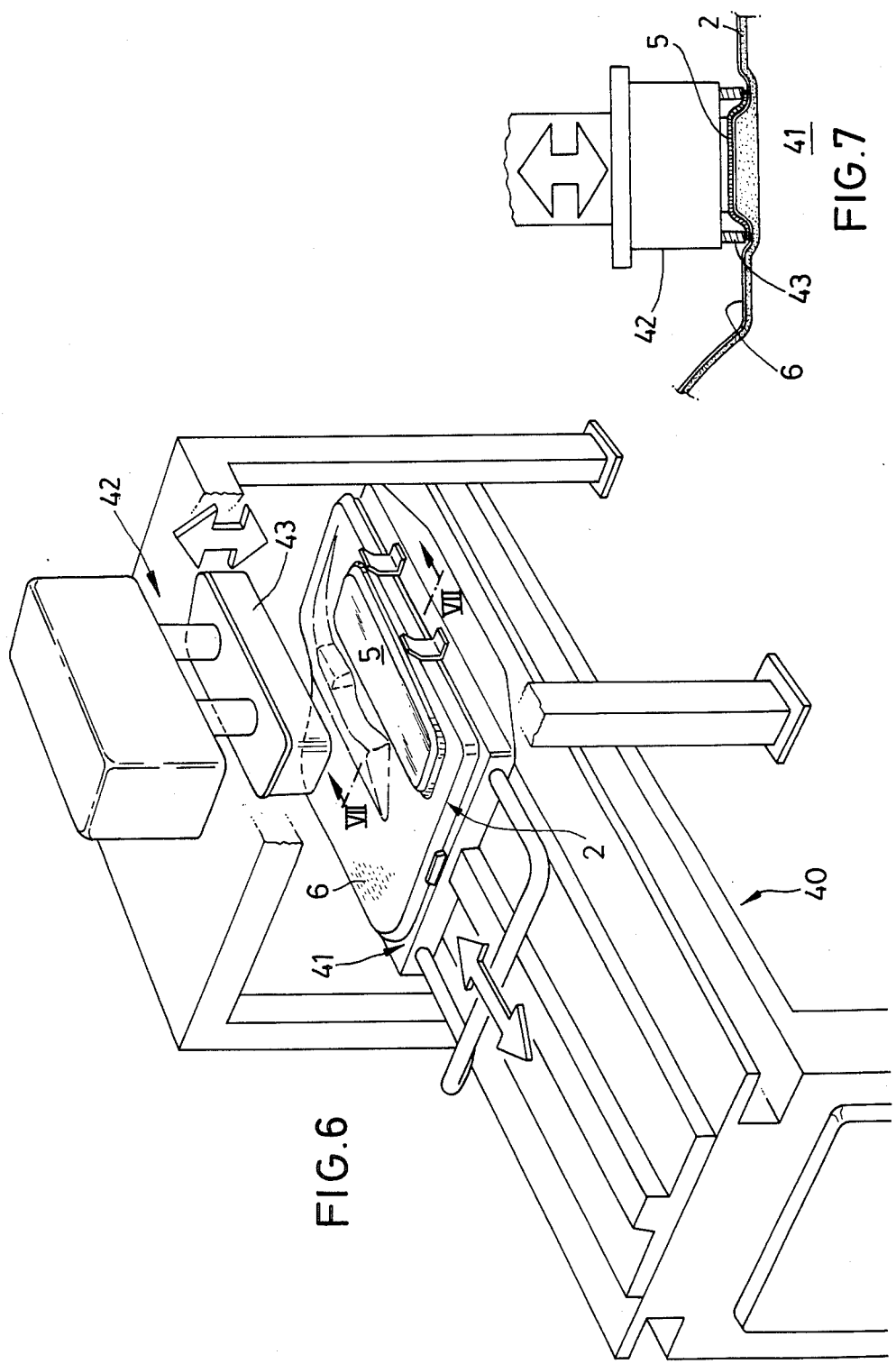
FIG. 6 is a perspective view of the sealing station.
FIG. 7 is a vertical section through the region of the sealing punch.

When the shaping tool is closed by the female mold 35, the advancing member 33 is first retracted and then the fibrous fleece mat 12 is consolidated by the action of pressure and heat into the shape shown in FIG. 5b. The finished base 2 is subsequently ejected by actuation of the ejectors 34 and the advancing member 33 which likewise acts as an ejector. The base may now be removed from the mold.

The shaped base 2 can now be transferred using a conventional conveying device past a spraying device which covers it with an overall coating of a thermosetting adhesive 6. The base 2 coated in this way with the adhesive 6 can now be loaded in the sealing station 40 (see FIG. 6) which essentially comprises a receiving member 41 for the shaped base and a sealing punch 42 with a peripheral electrode 43, the shape of which corresponds to the area of the padding and/or fabric insert 5 to be placed in position.

The arrangement of apparatus for producing an interior trim component according to the invention ensures a friction-free and substantially automatic manufacture of such interior trim components with the minimum of material wastage and rejects.

We claim:

1. An interior trim component for a motor vehicle comprising a compressed fiber base having a decorative surface, a plastic sheet adhered to at least selected portions of said decorative surface of said base, wherein said base is formed by compression molding a fibrous mat of substantially uniform thickness, selected areas of said fibrous mat being subjected to a lesser degree of compression than remaining areas of said fibrous mat, areas of said base corresponding to said selected areas of said mat being thicker than areas of said base corresponding to said remaining areas of said mat, and wherein a covering material other than said plastic sheet is adhered to said base and overlies said thicker areas of said base and portions of said base peripheral thereto, said plastic sheet and said covering material overlapping one another at said peripheral surface portions, and wherein said plastic sheet has impressed separation seams adapted to enable the removal of portions of said plastic sheet overlapping said covering material.

2. An interior trim component as claimed in claim 1, wherein said covering material comprises fabric.

3. An interior trim component as claimed in claim 1, wherein said covering material further comprises resilient padding material between said base and said fabric.

4. An interior trim component as claimed in claim 1, wherein said covering material is secured to said base by application of thermosetting adhesive to said base and, subsequently, heat sealing of said covering material thereto.

5. A trim component in a motor vehicle, having a visible surfaoe and comprising a substantially self-supporting fibrous base material and a plastic sheet bonded to said base material and forming at least a portion of said visible surface, said fibrous base material being the product of compression molding of a fibrous fleece mat of substantially uniform thickness of about 20 to 30 mm, under pressure of about 4000 N/M$^2$ and at a temperature of about 200° C., selected areas of said mat being subjected to a lesser degree of compression than remaining areas of said mat, areas of said base corresponding to said remaining areas having thickness equal to approximately one tenth that of said mat and areas of said base corresponding to said selected areas having thickness equal to approximately two to four tenths that of said mat.

* * * * *